United States Patent Office 3,214,454
Patented Oct. 26, 1965

3,214,454
PROCESS OF FORMING METAL ION COMPLEXES
Bruno Blaser, Dusseldorf-Urdenbach, and Karl-Heinz
Worms, Dusseldorf, Germany, assignors to Henkel &
Cie., G.m.b.H., Dusseldorf-Holthausen, Germany
No Drawing. Filed July 5, 1962, Ser. No. 207,803
Claims priority, application Germany, Sept. 6, 1958,
H 34,268
3 Claims. (Cl. 260—429.9)

The invention relates to acylation products, particularly those of phosphorous acid and its derivatives, as complex formers for metal ions. It is a continuation-in-part of our co-pending application Serial Number 829,204, filed July 24, 1959, and now abandoned.

These acylation products can be produced, e.g., by reacting phosphorous acid with acid anhydrides and/or acid chlorides, especially those of acetic, propionic, butyric, valeric and caproic acid. When both the anhydride and the chloride are used simultaneously, they must be derived from the same acid, e.g., the anhydride and the chloride of acetic acid can be used simultaneously, but not acetic anhydride together with propionic chloride. In lieu of phosphorous acid and one of the acid chlorides named above, phosphorus trichloride can be reacted with one of the carboxylic acids themselves. Particularly readily available are the reaction products of phosphorus acid with acetic anhydride, with acetyl chloride or with a mixture thereof. The reactions opportunely are carried out at elevated temperatures, preferably between 50 and 200° C.

The acylation products of phosphorus acid, depending upon the process whereby they are manufactured, are obtained in pure form, but frequently in the form of mixtures. As has been ascertained, by the reactions described above, all products obtained contain at least two phosphorus atoms in their molecules. Of the products whose constitution is established, the following representative formula is of especial importance:

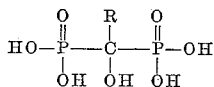

wherein R denotes a low alkyl radical having 1 to 5 carbon atoms. When mixtures are obtained, the products also have the above formula wherein the OH groups are partially esterified. The acyl group, in that case, corresponds to the carboxylic acid component used in the reaction. Furthermore, two or more molecules of the above formula may convert into the corresponding intermolecular anhydrides while splitting off water and thus may be present together with the compound conforming to the formula given.

To date, the organic acylation products of phosphorous acid or its derivatives have not found practical application.

It now has been found that the above-mentioned compounds can be employed very well as complex formers for metal ions, particularly for polyvalent metal ions. As will be shown below, the pure, or refined, compounds as well as the above mixtures, or crude compounds, can be employed. For example, they are eminently suited for binding calcium ions to a large extent and, hence, can be used especially for water-softening purposes. It should be noted that stoichiometrical quantities are not required for such an application, but that calcite precipitation is effectively delayed by the use of substoichiometrical amounts. What constitutes stoichiometrical quantities for the compound employed is easily established by a simple test.

For practical purposes, other applications also are feasible. For instance, textiles can be freed from encrustations due to the deposition of alkaline earth salts. Textiles which had been washed with soap or pyrophosphate-containing agents can be treated with the above-named compounds in order to decrease the ash content. In cleansing processes, particularly bottle washing, the use of substoichiometrical amounts of the compounds according to the invention avoids the precipitation of calcites.

The capability of these organic acylation products of phosphorous acid and its derivatives to form complexes also can be utilized to good advantage in systems wherein copper ions have an undesirable effect. As an example, the avoidance of decomposition of per-compounds substances by copper ions is named. The compounds according to the invention also can well serve as additives to dye baths for textiles to bind metal ions as complexes in order to prevent these metal ions from forming undesirable hues and shades of the color. For these purposes, the use of stoichiometrical quantities is required.

Furthermore, the capability of the organic acylation products of phosphorous acid or its derivatives to form complexes with metal ions can be used for the supply of trace elements to plants.

The surprisingly strong ability of these compounds to form complexes is shown by the fact that, in certain concentrations, the blue color characteristic for trivalent iron ions, known as "Berlin blue" or "Prussian blue," does not occur. Also, the red color induced by the addition of thiocyanates to solutions containing trivalent iron ions does not occur. Moreover, the formation of the blue-colored copper tetrammine and nickel hexammine complexes is suppressed by the presence of the above-named phosphorous acid compounds.

The properties just mentioned can advantageously be employed to inhibit the deposition of iron compounds, particularly iron hydroxide, on textiles or during bottle washing procedures.

The organic acylation products of phosphorous acids or its derivatives can be used, according to the invention, in acid, alkaline or neutral solution.

The invention now will be further illustrated by the following examples. However, it should be understood that these are given merely by way of explanation, not of limitation, and that numerous changes may be made in the details without departing from the spirit and the scope of the invention as hereinafter claimed.

EXAMPLE 1

The capability of organic acylation products of phosphorous acid or its derivatives to bind calcium can be shown by the foaming characteristics of soap solutions in hard water.

For this purpose, a solution is prepared of 2 drops of a soap solution according to Boutron and Boudet in 20 ml. water of 20° hardness. To this is added a molar soda solution, 5 ml. at a time.

The test solutions thus prepared do not foam upon shaking. Foaming does occur, however, upon addition of an aqueous solution of the above-described organic acylation products of phosphorous acid. The concentration of such a solution is selected so that, by calculation, 0.4 g. $P_2O_5$ are present in 100 g. $H_2O$. In this manner, the amount of ml. used is the calcium titer. The latter is defined, as is known, as the amount of $P_2O_5$ (in grams) which binds 1 g. CaO. When all CaO is bound, no more insoluble calcium soaps are present, and a stable foam forms upon shaking.

The properties of the solutions and the results obtained are given in Table 1 below, whereby the products numbered 1–9 had been obtained as follows:

(1) The crude acylation product of phosphorous acid with acetyl chloride in the presence of acetic anhydride.

(2) The reaction product of phosphorous acid with acetyl chloride, refined by recrystallization.

(3) The crude reaction product of phosphorous acid with propionic acid anhydride.

(4) The refined reaction product of phosphorous acid with propionic acid anhydride.

5. The crude reaction produce of phosphorous acid with butyric acid chloride.

(6) The fined reaction product of phosphorous acid with butyric acid chloride.

(7) The refined reaction product of phosphorous acid with valeric acid chloride.

(8) The cruide reaction product of phosphorous acid with caproic acid chloride.

(9) The refined reaction product of phosphorous acid with caproic acid chloride.

The products numbered 2, 4, 6, 7 and 9 correspond to the formula

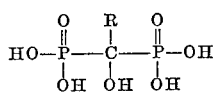

whereby R is $CH_3$ or an alkyl radical having 2, 3, 4 or 5 carbon atoms, in the sequence of the products named.

Products 1, 3, 5 and 8 are crude materials obtained by the preparation described above. The crude products contain, as far as is known to date, beside the products of the structural formula given above, other materials which had been formed by intermolecular esterification or anhydride formation, or compounds of the formula given above, which are acylated at the alcoholic OH-group.

The results given in Table 1 are averages of a series of tests. While carrying out the tests, not only the free acids, but also their corresponding sodium-, potassium-, ammonium- and ethanolamine salts are used. These had been obtained from the free acid by neutralization with a sufficient quantity of hydroxides, carbonates or bicarbonates of sodium, potassium, ammonium or mono-, di- and triethanolamines. The term "neutralization" in the scope of this invention is to be interpreted as a full or partial substitution of the acid hydrogen atoms, by sodium, potassium or ammonium. The maximum exchange in the instance of the above formula is that of four hydrogen atoms, namely of those hydrogen atoms which are connected, by way of an oxygen atom, to an atom of phosphorus. The products thus obtained do not react neutral, but the pH value, upon exchange of a single hydrogen atom, is between 2 and 3; upon exchange of 2 hydrogen atoms, the pH is 5 to 6; on exchange of 3 hydrogen atoms, the pH is 9 to 10; and when four hydrogens are exchanged, the pH increases to a value between 11 and 12.

Also investigated were compounds which had been partially esterified into water-soluble mono- and dialkyl esters by the reaction with methanol, ethanol, propanol and butanol, respectively. They are not especially named in Table 1 since the results obtained did not perceptibly vary from those wherein the free acids or their salts had been employed.

In the subsequent examples, the same numbers are used for the compounds listed above.

Table 1

| Acylation Product No. | Ml. Solution (calcium titer) | Remarks |
| --- | --- | --- |
| 1 | 4.5 | |
| 2 | 5 | |
| 3 | 5 | |
| 4 | 5 | |
| 5 | 4.2 | |
| 6 | 3.5 | |
| 7 | 4.2 | |
| 8 | 3.5 | Slightly opaque. |
| 9 | 3.5 | Do. |

EXAMPLE 2

For a comparison of the effectiveness in preventing scale formation (e.g., in boilers, tubes, etc.), solutions were prepared of pentasodiumtripolyphosphate, ethylenediaminetetraacetic acid (EDTA) and of a number of acylation products of phosphorous acid. These were aqueous solutions using water of a total hardness of 17.15° (carbonate hardness 10.50°), at a concentration of 10 mg./l. (10 milligrams per liter).

100 ml. of each of these solutions were adjusted with NaOH to a pH of 9.0 and 10.0, respectively, measured on a mercurous chloride glass electrode, and heated for one hour (including the upheat time) at 80° C. in a thermostatically controlled vessel. Subsequently, the solution was filtered immediately from the precipitate formed, and the beakers were cleaned by spraying their walls with a 1 percent $(NH_4)_2CO_3$ solution. Precipitate still remaining on the beaker walls then was dissolved in dilute HCl. In that solution and in the filtrate, the hardness was determined with EDTA. The values given in Table 2 below denote the total precipitation in mg. CaO, the values in parentheses ( ) are those for the precipitate clinging to the beaker walls. The figures given are averages of four different determinations.

Table 2

| Additive | pH 9 | pH 10 |
| --- | --- | --- |
| 0 (Blank Test) | 6.00 (3.2) | 13.50 (6.1) |
| Pentasodiumtripolyphosphate | 0.99 (0.2) | 7.55 (2.25) |
| Ethylenediaminotetraacetic acid | 4.80 (2.3) | 13.20 (3.2) |
| Acylation product No. 2 | 0.75 (0.1) | 6.35 (9.4) |
| Acylation product No. 6 | 0.7 (0.0) | 4.4 (0.1) |
| Acylation product No. 9 | 0.75 (0.3) | 4.6 (0.1) |

EXAMPLE 3

Small amounts of acylation products of phosphorous acid in solution were added continuously to solutions containing metal ions as shown in Table 3. The point was established at which the polyvalent metal ions were fully bound by this addition. To establish that point, Eriochrome black T was used as indicator, and a pH of 10 was maintained. This kind of determination can be used, e.g., for magnesium, calcium and zinc. For bivalent copper ions, the pH was held at 8, and Murexid used as indicator. For trivalent iron, the determination was carried out by titration in hydrochloric acid solution against thiocyanate.

Table 3 gives the consumption, calculated in gram-atoms phosphorus per gram-atom metal, in these titrations.

Table 3

| Metal ions: | Consumption g.-atoms P/g.-atoms metal |
| --- | --- |
| $Mg^{2+}$ | 2.7 |
| $Ca^{2+}$ | 1.9 |
| $Zn^{2+}$ | 2.5 |
| $Cu^{2+}$ | 2.6 |
| $Fe^{3+}$ | 2.0 |

EXAMPLE 4

The capability of forming complexes with iron in soda-alkaline solution compared to ethylene diamine tetraacetate (EDTA) is shown in Table 4. The following testing procedure was used:

To 10 ml. of a 0.01 mol $FeCl_3$ solution, 15 ml. of a solution were added containing 5 millimols $Na_2CO_3$. To these solutions, increasing amounts of the complex formers were added, and the mixture heated to boiling.

Table 4 shows the exact quantities with which no longer a precipitation of $Fe(OH)_3$ occurred.

Table 4

| Substance: | Millimols |
|---|---|
| EDTA | *1 |
| Acylation product No.: | |
| 1 | 0.1 |
| 2 | 0.03 |
| 3 | 0.09 |
| 4 | 0.04 |
| 5 | 0.05 |
| 6 | 0.03 |
| 7 | 0.03 |
| 8 | 0.05 |
| 9 | 0.04 |

*Trace precipitate.

EXAMPLE 5

The capacity of forming complexes with copper in soda-alkaline solution, as compared to ethylenediaminotetraacetate (EDTA) is shown in Table 5 below.

The testing conditions corresponded to those in Example 4, except that, in lieu of a 0.01 mol solution $FeCl_3$ solution, a 0.01 molar solution of $CuSO_4$ was used.

Table 5 shows the exact quantities of complex formers with which no longer a precipitation or discoloration occurred.

Table 5

| Substance: | Millimols |
|---|---|
| EDTA | 0.3 |
| Acylation product No.: | |
| 1 | 0.05 |
| 2 | 0.03 |
| 6 | 0.02 |
| 7 | 0.03 |
| 9 | 0.03 |

We claim as our invention:

1. A process of forming bivalent and trivalent metal ion complexes which comprises adding to aqueous solutions containing said metal ions a substance, in amounts ranging from 1 mol per 5,000 mols metal up to stoichiometrical quantities, selected from the group consisting of an organic phosphorous acid compound having the formula

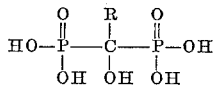

wherein R denotes an alkyl having 1 to 5 carbon atoms; alkali metal-, ammonium- and ethanolamine salts of said substance; and mono- and dialkyl esters thereof with methanol, ethanol, propanol or butanol.

2. A process of forming complexes of metal ions selected from the group consisting of magnesium, calcium, zinc, copper and iron, which comprises adding to aqueous solutions containing said ions a substance selected from the group consisting of an organic phosphorous acid compound having the formula

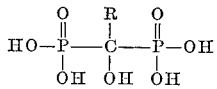

wherein R denotes an alkyl having 1 to 5 carbon atoms; alkali metal-, ammonium- and ethanolamine salts of said substance; and mono- and dialkyl esters thereof with methanol, ethanol, propanol or butanol.

3. A process of forming complexes of metal ions selected from the group consisting of magnesium, calcium, zinc, copper and iron, which comprises adding to aqueous solutions containing said ions a substance, in amounts ranging from 1 mol per 5,000 mols metal to stoichiometrical quantities, selected from the group consisting of an organic phosphorous acid compound having the formula

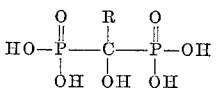

wherein R denotes an alkyl having 1 to 5 carbon atoms; alkali metal-, ammonium- and ethanolamine salts of said substance; and mono- and dialkyl esters thereof with methanol, ethanol, propanol or butanol.

References Cited by the Examiner

UNITED STATES PATENTS

| | | | |
|---|---|---|---|
| 2,758,971 | 8/56 | Mikeska | 260—461 X |
| 2,837,488 | 6/58 | Ferris | 260—461 X |
| 2,841,611 | 7/58 | Bersworth | 260—500 |
| 2,900,408 | 8/59 | Blazer et al. | 260—461 |
| 3,008,816 | 11/61 | Hemwall | 260—461 X |

CHARLES B. PARKER, *Primary Examiner.*

IRVING MARCUS, *Examiner.*